US006857682B2

(12) United States Patent
Eggers et al.

(10) Patent No.: US 6,857,682 B2
(45) Date of Patent: Feb. 22, 2005

(54) COVER SYSTEM FOR A SIDE-DUMP CONTAINER

(75) Inventors: Ronald L. Eggers, Fremont, NE (US); Steven A. Henning, Speedway, IN (US)

(73) Assignee: Aero Industries, Inc., Indianapolis, IN (US)

( * ) Notice: Subject to any disclaimer, the term of this patent is extended or adjusted under 35 U.S.C. 154(b) by 0 days.

(21) Appl. No.: 10/354,881

(22) Filed: Jan. 30, 2003

(65) Prior Publication Data

US 2004/0150244 A1 Aug. 5, 2004

(51) Int. Cl.$^7$ ................................................. B60J 11/00
(52) U.S. Cl. ........................................................ 296/98
(58) Field of Search ............................ 296/98, 100.11, 296/100.14, 100.15, 100.16

(56) References Cited

U.S. PATENT DOCUMENTS

| | | | |
|---|---|---|---|
| 4,518,193 A | 5/1985 | Heider et al. | |
| 4,673,208 A | 6/1987 | Tsukamoto | |
| 5,002,328 A | 3/1991 | Michel | |
| 5,480,214 A | 1/1996 | Rogers | |
| 6,142,554 A | 11/2000 | Carroll et al. | |
| 6,199,935 B1 | 3/2001 | Waltz et al. | |
| 6,206,449 B1 | 3/2001 | Searfoss | |
| 6,318,790 B1 * | 11/2001 | Henning | 296/98 |
| 6,513,856 B1 * | 2/2003 | Swanson et al. | 296/98 |

OTHER PUBLICATIONS

Agri–Cover, Inc., EZ–LOC Electric Tarp. http://www.agri-covers.com/ez_loc/electric.php.
Agri–Cover, Inc., SRT–2 Electric Tarp. http://www.agri-covers.com/crt2e/default.
Roll–Rite Electric Tarp System, Side Dumps. http://www.rollrite.com/complete_systems.asp?ID-2.

* cited by examiner

Primary Examiner—Joseph D. Pape
(74) Attorney, Agent, or Firm—Maginot, Moore & Beck

(57) ABSTRACT

A deployment apparatus for a flexible cover sized to cover a side-dump container comprises first and second swing arm assemblies pivotally mounted at a pivot point to opposite sides of the container. A drive assembly connected to the roll tube of the flexible cover is operable to rotate the roll tube so that the flexible cover winds around the roll tube. The drive assembly is slidably supported on one of the swing arms so that the mechanism translates along the length of the swing arm as it winds the flexible cover around the roll tube. A stop is provided on the swing arm between the pivot point and the free end to limit the translation of the drive assembly along swing arm. In another form, the drive assembly is fixed to a swing arm that is slidably received in a pivoting spring mechanism.

24 Claims, 11 Drawing Sheets

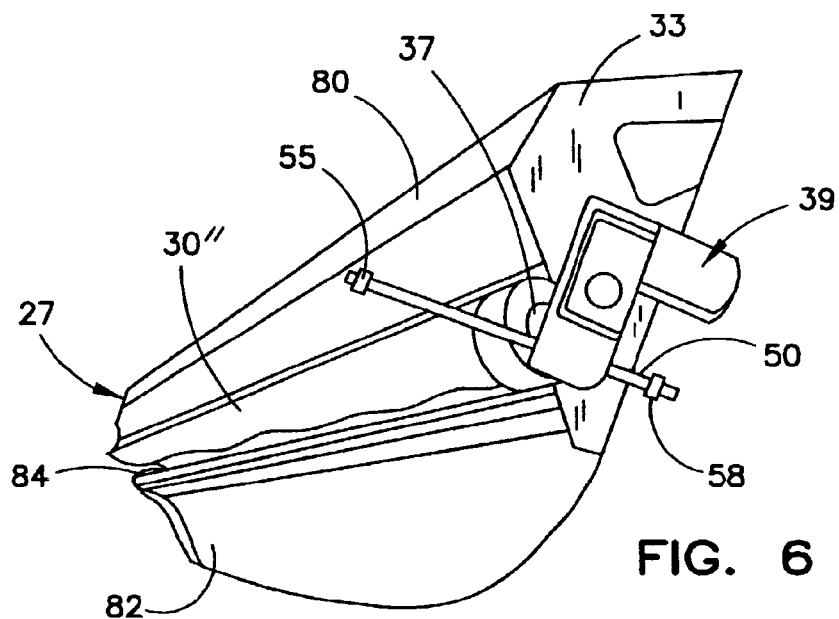
FIG. 6
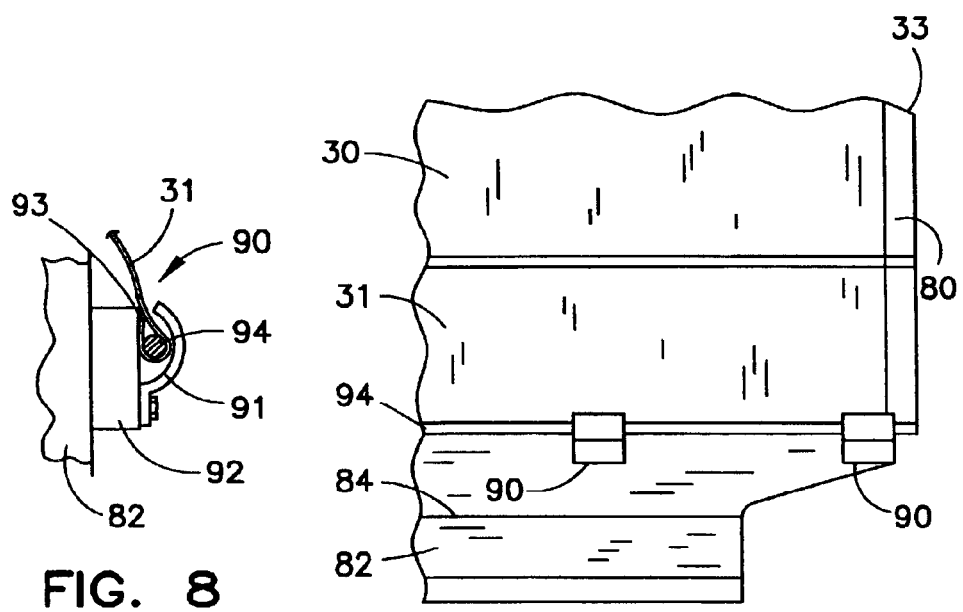
FIG. 8
FIG. 7

US 6,857,682 B2

COVER SYSTEM FOR A SIDE-DUMP CONTAINER

BACKGROUND OF THE INVENTION

The present invention relates to a cover or tarping system for a container, especially a dump body on a vehicle. The invention is particularly suited for side-to-side cover systems and side-dumping vehicles.

A wide array of open-topped containers is provided for storing and hauling various materials, ranging from refuse to agricultural products. When the open-topped container is carried by vehicle, a cover system is highly preferable to protect the contents from the elements and to eliminate the effects of wind as the vehicle travels along the road. Just as there are many types of open-topped containers, there are an equal number of types of cover systems for these containers, and especially cover systems for dump bodies on vehicles.

In one particular type of system, the cover or tarpaulin is conveyed from one long side of the vehicle to the other side to alternately cover or expose the contents of the container. In some systems, a spring-biased deployment apparatus is utilized in which a torque generated by a number of torsion spring causes the cover to be deployed. In these types of systems, a motor, such as an electric or a hydraulic motor, is used to provide powered deployment of the cover. In some systems, the motor operates directly upon bail arms that are attached to a free end of the tarpaulin. In other systems, the motor drives a roll tube to which the free end of the flexible cover is connected. The motor rotates the roll tube so that the tarpaulin winds and unwinds around the bar.

In most side-to-side cover systems—i.e. cover systems that move across the width of the container from one long side to the other side—a motor is required due to the extremely long and heavy tarpaulin. One such system of this type is shown in U.S. Pat. No. 5,002,328 to Walter Michel. In this system a telescoping arm is pivotably mounted to one end of the vehicle container body. A drive motor is mounted to the free end of the telescoping arm, which motor is then connected to the roll tube of the flexible cover. As the motor is operated to rotate the roll tube, the tube rolls along the end cap of the container to wind or unwind the tarpaulin from around the roll tube.

The use of the side-to-side spanning flexible covers is complicated when applied to a side-dumping container. One container of this type is described in U.S. Pat. No. 5,480,214 to Ralph Rogers. As shown in FIG. 1, the side-dump trailer 10 includes a vehicle frame 11 that supports a dump body 13 that spans the length of the trailer. In a common application, the dump body 13 is configured to haul rock, gravel, dirt, rip rap, etc.

The side-dump trailer 10 of this type is configured so that it can be tipped from either side of the trailer 11. Thus, the dump body 13 is provided with a pair of rocker pin assembly 15 on opposite sides of the body. Each rocker pin assembly 15 includes an axle 16 that is mounted within a saddle support assembly 18 connected to the vehicle frame 11. A pivot assembly cylinder 20 is mounted between the vehicle frame 11 and the top of the dump body 13.

When the vehicle is being driven on the road, the dump body is in its hauling position 13' as shown in phantom lines. However, when it is desired to dump the load, the pivot pin 16 can be released from the saddle support assembly 18 on one side of the vehicle frame 11. The pivot assembly cylinder 20 is then actuated to push against the top of the dump body 13 causing it to pivot about the axle 16 and saddle support assembly 18 on the opposite of the vehicle. Alternatively, the rocker pin assembly 15 can be released on the opposite side of the vehicle so that the dump body 13 can pivot on the other side of the vehicle frame 11.

While side-dumping vehicles such as vehicle 10 are very versatile, they present difficulties for the mounting and control of flexible cover systems. The present invention addresses and solves these difficulties.

SUMMARY OF THE INVENTION

A deployment apparatus is provided for a flexible cover sized to cover an open-topped container, the flexible cover connected at one end to the container and having an opposite free end connected to a roll tube. In one aspect of the invention, the deployment apparatus includes a first swing arm assembly pivotally mounted at a first pivot point to a first end of the container and a second swing arm assembly pivotally mounted at a second pivot point to a second end of the container. The first swing arm assembly includes a first spring mechanism, a first swing arm retained by the first spring mechanism and having a first free end extending from the first spring mechanism toward the open top of the container. The second swing arm assembly includes a second spring mechanism, a second swing arm retained by the second spring mechanism and having a second free end extending from the second spring mechanism toward the open top of the container.

A drive assembly is connected to one end of the roll tube and is operable to rotate the roll tube so that the flexible cover winds around the roll tube as it is supported by the first swing arm. The first and second swing arm assemblies are operative to extend the roll tube beyond a distance from respective first and second pivot points to either side of the container during deployment and retraction of the flexible cover.

According to one form of the invention, the deployment apparatus includes at least one stop disposed on the first swing arm between the first pivot point and the first free end. This stop, which can be a collar and set screw arrangement, is operable to limit the translation of the drive assembly along the first swing arm. One stop can be provided adjacent the free end of the first swing arm to prevent removal of the drive assembly beyond the end of the first swing arm. Another stop can be provided between the drive assembly and the first pivot point to limit the downward translation of the drive assembly along the first swing arm. The position of this lower stop can be calibrated to allow the deployment apparatus to negotiate a tarp over a heaped load within the container.

According to another form of the invention, the first swing arm is retained by the first spring mechanism so as to be translatable therein. Moreover, the second swing arm is retained by the second spring mechanism so as to be translatable therein.

In certain embodiments, the spring mechanisms connect the swing arms to the container at the respective pivot points. Each spring mechanism is preferably operable to bias its swing arm to a position in which the tarp extends across the open top of the container. In other embodiments, the drive assembly can include a support plate, a drive motor mounted on the mounting plate and a transmission mechanism connecting the drive motor to the roll tube. The support plate can be provided with a bearing assembly for slidably supporting the support plate on the swing arm.

Another aspect of the invention contemplates a method for deploying a flexible cover sized to cover an open-topped container, the flexible cover connected at one end to one side of the container and having an opposite free end connected to a roll tube that is deployable across the container to the other side thereof. In this aspect, the method comprises the steps of providing a swing arm assembly pivotally mounted to the container at a pivot point at one end of the container to pivot between the sides of the container, the swing arm assembly having a spring mechanism defining the pivot point, the swing arm retained by the spring mechanism and having a free end extending from the spring mechanism toward the open top of the container, and providing a drive assembly supported on the swing arm. The method further includes the steps of supporting the roll tube on the drive assembly and winding the flexible cover onto the roll tube so that the tension in the flexible cover as it is wound onto the roll tube pulls the swing arm toward one side of the container against action of the spring mechanism and so that the tension in the flexible cover causes the roll tube to translate relative to the pivot point along the longitudinal axis of the swing arm.

The method can further comprise the step of limiting the downward movement of the roll tube relative to the free end portion as the swing arm pivots across the midpoint of the container so that the flexible cover remains elevated above the container at the midpoint. In embodiments where the flexible cover is connected to the container below the one side, the step of winding can continue until the wound cover is immediately adjacent the connected end of the cover.

One benefit of the deployment apparatus of the present invention is that it can be readily implemented on side-dumping containers. A further benefit is that the mechanism easily accommodated heaped loads in an open-topped container. Other benefits and advantages of the invention will be appreciated from the following written description and accompanying figures.

DESCRIPTION OF THE FIGURES

FIG. 6 is a forward-facing perspective view of the side of the dump body with the cover shown in its rolled and stowed position.

FIG. 7 is a side view of the components for mounting the fixed end of the flexible cover to the dump body.

FIG. 8 is an end view of the components for mounting the fixed end of the flexible cover to the dump body.

DESCRIPTION OF THE PREFERED EMBODIMENTS

Figure 1:
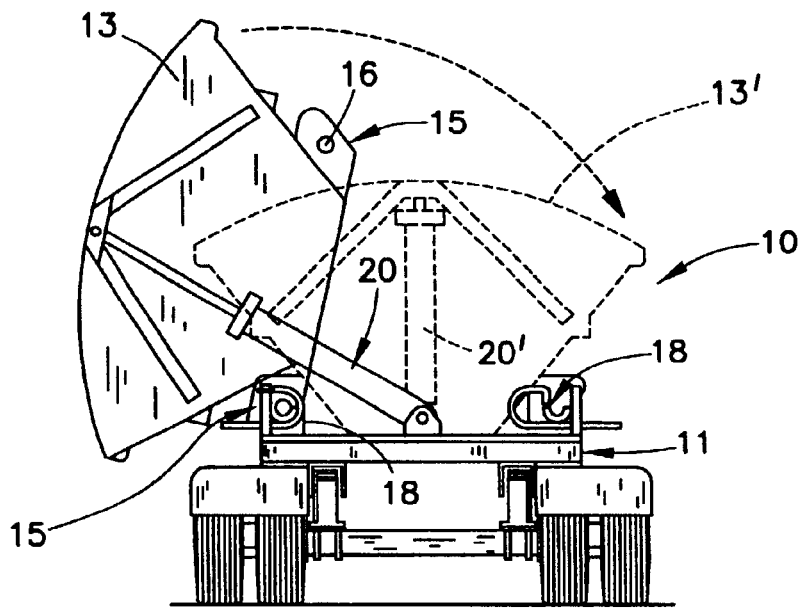
FIG. 1 is an end view of a side-dumping vehicle of the prior art.

For the purposes of promoting an understanding of the principles of the invention, reference will now be made to the embodiments illustrated in the drawings and described in the following written specification. It is understood that no limitation to the scope of the invention is thereby intended. It is further understood that the present invention includes any alterations and modifications to the illustrated embodiments and includes further applications of the principles of the invention as would normally occur to one skilled in the art to which this invention pertains.

The present invention contemplates utilizing a flexible deployment cover mechanism on a side-dump trailer. Thus, in accordance with one embodiment of the invention, a modified side-dump trailer 25 is provided with a modified dump body 27. In particular, the dump body 27 is modified from the body 13 shown in FIG. 1 by the addition of a flexible cover or tarpaulin (tarp) 30 and a deployment apparatus 35. The tarp has a fixed end 31 that is fixed or connected to a side wall 28 of the dump body 27. Preferably, the fixed end 31 of the tarp is wrapped around the side edge or side rail of the dump body 27 in a manner described in more detail herein.

Figure 2:
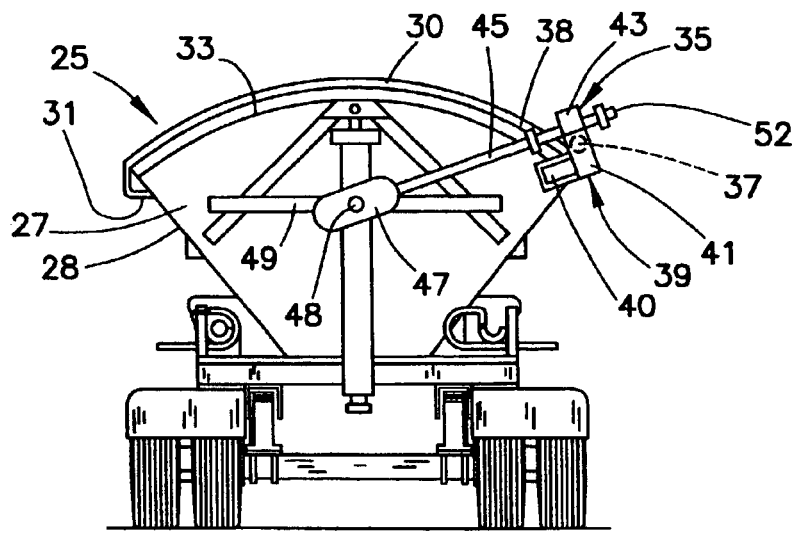
FIG. 2 is an end view of a side-dumping vehicle modified from the prior art to include a cover deployment apparatus in accordance with one embodiment of the present invention.

As shown in FIG. 2, the tarp extends from one side of the vehicle to the other across the dump body end cap 33. Preferably, the tarp is deployed in tension so it remains firmly stretched across the end cap 33. As depicted in FIG. 2, the tarp 30 is fully deployed across the open top of the dump body 27 so that the deployment apparatus 35 is situated to the opposite side of the vehicle from the fixed end 31 of the tarp 30.

Figure 3:
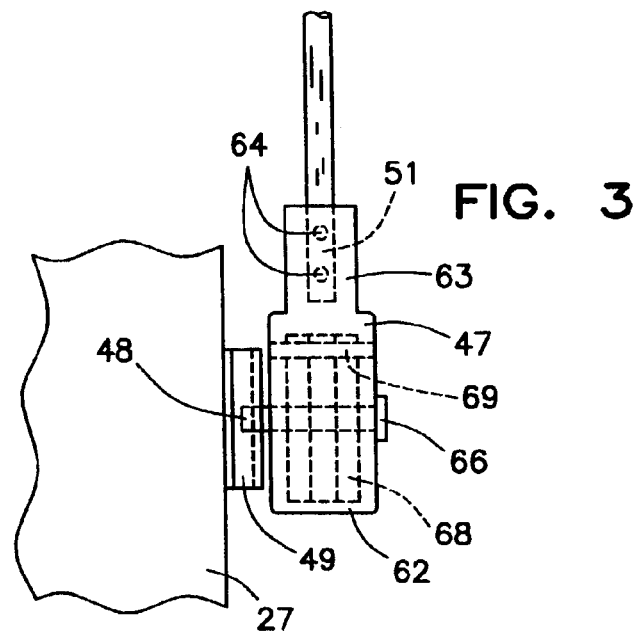
FIG. 3 is a side view of the components of the cover deployment apparatus shown in FIG. 2.

The free end of the tarp is connected to a roll tube 37, shown in FIGS. 2 and 3, which can be of well known configuration. The roll tube 37 spans the length of the dump body 27 and is sized and configured so that the tarp 30 can be wound onto the roll tube as the deployment apparatus 35 is moved to the other side of the dump body 27. In particular, the roll tube 37 is connected to a free edge 38 of the tarp, as shown in FIG. 3.

Figure 4:
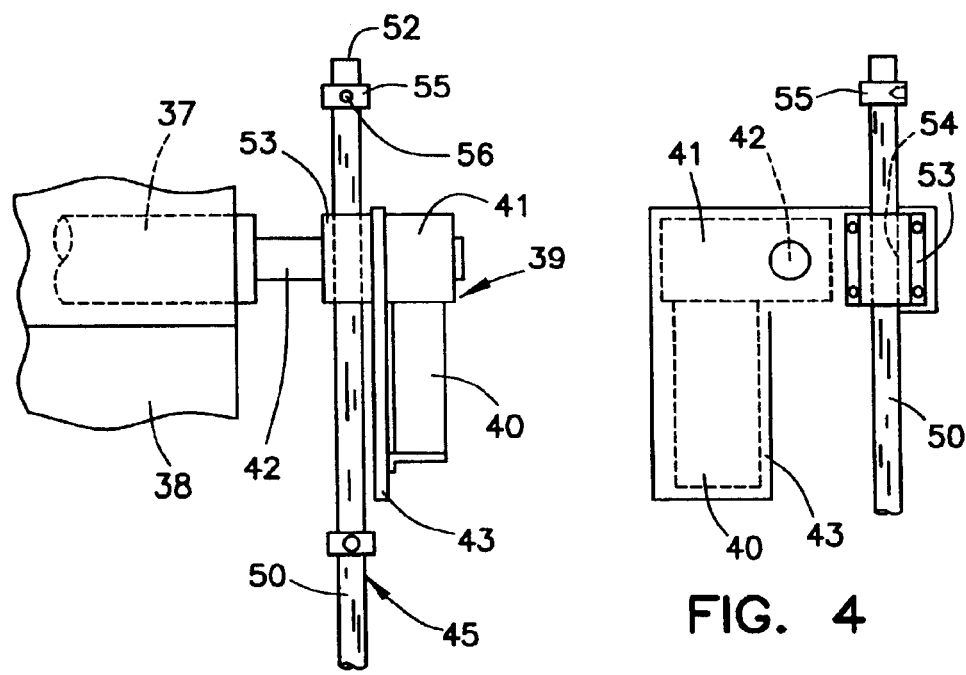
FIG. 4 is a rear view of certain components of the deployment apparatus shown in FIGS. 2 and 3.

Referring to FIGS. 3 and 4, the details of this side-to-side deployment apparatus 35 can be more readily appreciated. The apparatus 35 can include support assembly for rotatably supporting the roll tube while the roll tube, and consequently the flexible cover, travels across the open top of the container. In one embodiment, this support assembly is a drive assembly 39 that is connected to the tarp roll tube 37. The drive assembly 39 includes a drive motor 40 that is connected to the roll tube by way of a transmission 41. In the illustrated embodiment, a mating axle 42 extends from the transmission 41 and is engaged to the roll tube 37. The drive motor 40 and transmission 41 can be selected from a variety of known components that are used to rotate the roll tube of a flexible tarping system. Preferably, the drive motor 40 is an electric motor with appropriate electrical cabling extending along the side deployment apparatus 35 to connect with the electrical system of the vehicle. If the drive motor is hydraulic, appropriate pressure lines can be strung along the mechanism 35 to connect to the vehicle hydraulics. It is understood that the motor 40 can be activated in a conventional manner, such as by a switch in the cab of the vehicle, or a switch at the end of the dump body 27 directly adjacent the drive assembly 39 itself.

The motor is preferably a reversible motor to provide for powered retraction or winding of the tarp onto the roll tube and controlled unwinding of the tarp from the roll tube. Alternatively, the motor can be powered in one direction only, and more specifically to rotate the roll tube in the direction to wind the flexible cover onto the roll tube. With this alternative, the motor can free-wheel in the opposite rotational direction, such as by incorporating a clutch in the transmission 41.

The drive assembly 39 is supported by a support plate 43. Preferably, each of the components, namely the drive motor 40 and the transmission 41, are mounted to the support plate 43 in a conventional manner. The mating axle 42 can extend through an appropriate opening formed in the support plate 43 so that it can be integrated to the roll tube 37.

The side roll deployment apparatus 35 includes a swing arm assembly 45 in addition to the drive assembly 39. While the drive assembly 39 rotates the roll tube 37, the swing arm assembly 45 operates to swing or pivot the entire drive assembly from one side of the dump body to the other. Thus, the swing arm assembly 45 can include a swing arm 50 that extends from a pivot mount, which is preferably a spring mechanism 47 mounted to the dump body 27 at a spring mount 49. Preferably, the spring mount 49 is a bracket that extends across the width of the dump body, as shown in FIG. 2. The swing arm 50 has a fixed or pivot end 51 that that is fixed or connected to the spring mechanism 47 and an opposite free end 52 that extends above or beyond the top of the dump body 27 as shown in FIG. 2.

As shown best in FIG. 4, the free end 52 extends through a bearing block 53 that is mounted to the support plate 43. The bearing block 53 defines a bearing channel 54 through which the swing arm 50 extends. Preferably, the bearing channel is configured to permit smooth sliding movement of the support plate 43 relative to the swing arm 50. In certain embodiments, the bearing channel 54 can include a bushing disposed around the swing arm 50. The bushing or the interior of the bearing channel 54 can be formed of Delrin®, Teflon® or other low-friction material.

The support plate 43 is essentially carried by the swing arm 50 and the roll tube 37. As shown in FIG. 3, the swing arm 50 and the bearing block 53 can be disposed on the inboard side of the support plate 43, as opposed to the outboard side on which the drive assembly 39 is mounted. This orientation can be preferred to eliminate any twisting of the support plate that might occur if the swing arm was carried on the opposite side of the plate from the roll tube. It is understood, of course, that other orientations of the components carried by the support plate 43 are contemplated. Likewise, other configurations of the support plate itself, beyond that shown in FIGS. 3 and 4, are also contemplated. Nevertheless, the important aspect of the support plate 43 is that it carries the drive assembly 39 that rotates the tarp roll tube 37, as well as a bearing element to permit sliding movement of the support plate relative to the swing arm 50.

In accordance with one aspect of the invention, the swing arm assembly 45 is connected to the dump body 27 at a pivot point 48. The swing arm 50 has a length measured from that pivot point 48 to its free end 52 that is greater than the distance from the pivot point 48 to the side edges or side rails of the dump body 27. Thus, the free end 52 of the swing arm in this embodiment can extend past the side edges of the dump body, as shown in FIG. 2. In accordance with one aspect of the preferred embodiment, an upper collar 55 is fastened at the free end 52 of the swing arm by way of a set screw 56. The upper collar prevents removal of the support plate 43 from the end of the swing arm 50. Alternatively, the free end 52 of the swing arm 50 can be enlarged to provide a natural stop against relative translation between the swing arm and the support plate 43. The upper collar 55 is preferred because its position relative to the free end 52 can be adjusted, to thereby adjust the upward extent of the relative movement between the support plate 43 and the swing arm 50.

In addition to the upper collar, a lower collar 58 is also provided in accordance with a further feature of the invention. The lower collar 58 can be connected to the swing arm 50 by way of a set screw 59. The lower collar 58 acts as a stop to restrict relative translation of the support plate 43 down the swing arm 50. As best shown in FIG. 2, the lower collar 58 is positioned at a distance along the swing arm 50 that is less than the distance from the pivot point 48 to the side edge of the dump body 27. The function of the lower collar 58 will be described in more detail below.

Turning now to the spring mechanism 47, as shown in FIG. 3, the mechanism includes a spring housing 62 that defines a hub 63. The hub is configured to receive the fixed end 51 of the swing arm 50. Mounting bolts 64 can be provided to firmly connect the swing arm to the spring housing 62. A pivot pin 66 connects the spring housing 62 to the spring mount 49, and ultimately establishes the pivot point 48 for the swing arm assembly 45. A spring pack 68 can be contained within the spring housing 62. The spring pack includes a number of torsion springs that provide a torque reaction between the pivot pin 66 and a reaction pin 69 extended through the spring housing 62.

A wide variety of spring mechanisms 47 can be utilized, with the understanding that the spring mechanism applies a biasing force to the swing arm 50. In accordance with the preferred embodiment, the torsion springs in the spring pack 68 can tend to bias the spring arm 50 to the position shown in FIG. 2 with the flexible tarp 30 fully deployed over the open top of the dump body 27. With this configuration, the drive assembly 39, then works against the torque generated by the spring mechanism 47. Specifically, as the drive assembly 39 causes the roll tube 37 to rotate, the tarp 30 is wound onto the roll tube. This winding operation causes tension in the tarp as the width of the tarp is shortened. This tension overcomes the spring force generated by the spring mechanism 47 to draw the entire mechanism toward the fixed end 31 of the tarp. The operation of powered roll tarps and spring assemblies is well known in the art. It is understood that if the motor 40 is reversible, the drive assembly constantly opposes the biasing force generated by the spring mechanism 47. It is further understood that if the motor 40 includes a free-wheeling mode of operation the motor will only oppose the spring biasing force in one direction, most appropriately in the retraction direction.

Figure 5A:
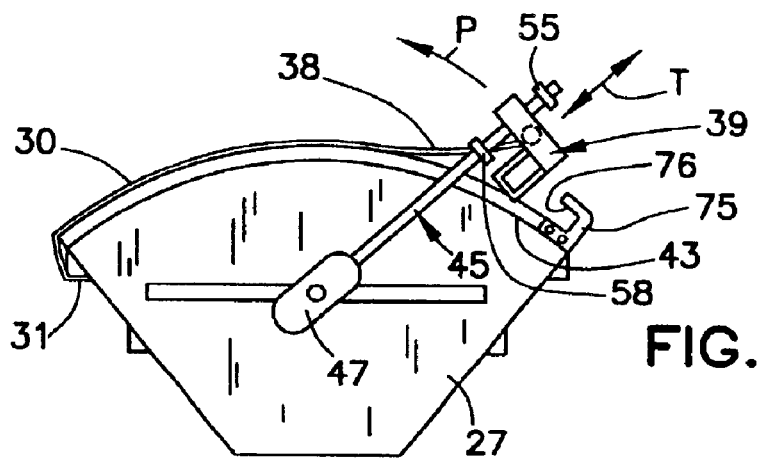
FIGS. 5a–5c are end views of the modified side-dumping vehicle from FIG. 2, with the cover deployment apparatus shown in different stages of its operation.
Figure 5B:
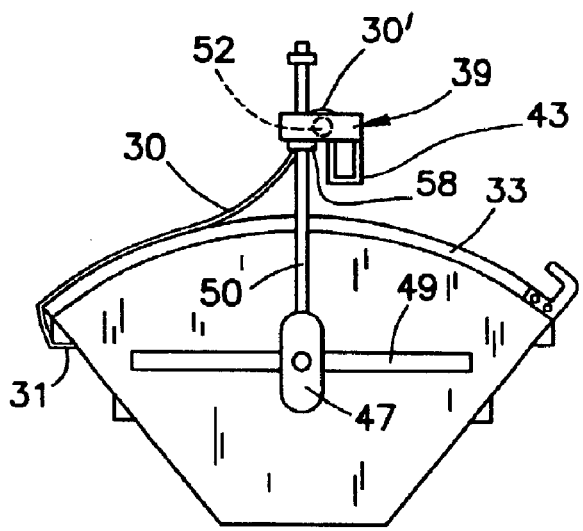
Figure 5C:
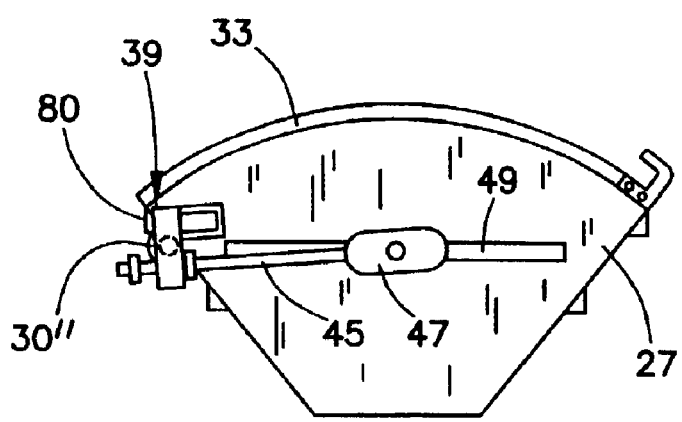

Referring to FIGS. 5a–5c, the operation of the side roll deployment apparatus 35 is depicted. As a precursor, it can be pointed out that a lock plate 75 can be provided at one side of the dump body. The lock plate 75 defines a notch 76 which receives the tarp roll tube 37 or the mating axle 42 when the deployment apparatus 35 is in its fully deployed position as shown in FIG. 2. In other words, the lock plate 75 operates as a seat for holding the tarp 30 in its deployed position. In the illustration to FIG. 5a, the drive assembly 39 has just been activated so that the roll tube has rotated and the tarp wound slightly onto the roll tube. With this movement, the entire assembly, including the support plate 43, drive assembly 39 and roll tube 37, pivots or rotates in the direction of the arrow P and the roll tube dislodges from the lock plate 75. With this movement, tension applied at the tarp free edge 38 tends to pull against the roll tube 37, and ultimately against the drive assembly 39. This pulling movement causes the support plate 43, onto which the drive assembly 39 is mounted, to translate in the direction of the arrow T along the length of the swing arm 50.

As the drive assembly 39 continues to rotate, the roll tube 37 also continues to rotate, drawing the deployment apparatus 35 to its central position as shown in FIG. 5b. In this position, both gravity and tension in the tarp 30 forces the support 43 down against the lower stop or collar 58. With this orientation, the tarp is in its partially wound position 30'. It is in this position that one beneficial feature of the present invention can be appreciated. Specifically, it can be seen that the partially wound tarp 30' is elevated above the end caps 33 and above the open top of the dump body 27. In this instance, if the dump body is carrying a heaped load, the tarp will not drag across the load and dislodge or disturb the load itself. Likewise, when the deployment apparatus 35 is moved from its wound to its extended or deployed position, the tarp 30 will not drag across the heaped portion of the load within the dump body.

As the drive assembly 39 continues to operate, the tarp is fully wound onto the roll tube into is wound configuration 30" as shown in FIG. 5c. Preferably, the wound tarp 30" is directly adjacent to the fixed end 31 of the tarp. Also preferably, and as shown clearly in FIG. 5c, the wound tarp 30" is situated below the side rail 80 of the modified dump body 27. This position of the wound 30" is another beneficial feature of the present invention. In particular, the tarp and roll tube are completely concealed from the side rail 80 of the dump body 27 so that when the body is pivoted toward that side (as shown in FIG. 1), the deployment apparatus 35 and tarp 30 will not interfere with the removal of the contents of the body. Likewise, with the tarp in its wound position, 30" shown in FIG. 5c, the dump body can be pivoted to the other side of the vehicle without fear of the deployment apparatus 35 falling forward due to gravity.

This "concealed" position of the wound tarp 30" is shown in detail in FIG. 6. From this figure it can be seen that the dump body 27 includes a side rail 80 that extends along the length of the body and a generally contiguous side wall 82. The wall can define a recess 84 beneath the side rail 80. The recess is sized to receive the entire flexible cover in its rolled or wound configuration 30". In this way, the roll tarp is clear of the dump body so that it does not interfere with the dumping of the material from the body.

The fixed end 31 of the flexible tarp 30 is connected to the dump body within the recess 84. Referring to FIGS. 7 and 8, it can be seen that the fixed end 31 of the tarp 30 includes a bar 94 extending along its length. The bar helps provide rigidity to the tarp to prevent bunching during use. The bar is connected to the side wall 82 in the recess 84 by way of a number of clamp assemblies 90. Each clamp assembly includes a clamping bracket 91 that is connected to the dump body by way of a mounting plate 92. The clamping bracket 91 forms a slot 93 between itself and the mounting plate 92. The bracket is sized to tightly receive the tarp bar 94 while the fixed end 31 of the tarp extends trough the slot 93, as shown best is FIG. 8. The clamp assemblies 90 provide an easy way for attachment of the fixed end 31 of flexible tarp 30 to the dump body 27. A number of these clamp assemblies can be spaced along the entire length of the tarp. In accordance with the present invention, different means for clamping the fixed end 31 of the tarp 30 to the truck body 27 can be implemented.

The present invention provides a tarp deployment apparatus that can be readily adapted for use with a variety of types of open-topped and vehicle-borne containers. While the mechanism is described in the context of a side-dumping container, the mechanism can be modified to deploy a tarp along the length, rather than across the width, of a container. Appropriate changes in the length of the swing arm would be necessary to accommodate the length of the tarp needed to span the length of the container.

In addition, the concepts of the present invention can be implemented in a variety of ways to deploy or retract a flexible cover or tarp over a heaped load. The stop collar 58 mounted on the swing arm 50 suspends the support plate 43 and consequently the roll tube 37 and the free end 31 of the tarp, over the load within the open-topped container. The stop collar does not inhibit movement of the support plate toward the free end of the swing arm, so that the free end 31 of the tarp can reach the side edges of the container. This function of the swing arm and stop collar can be maintained regardless of the motive force behind movement of the tarp. In other words, the tarp can be self-winding at its fixed or free ends, can be manually deployed by a pull rope, or mechanically pivoted from side-to-side at the pivot point 47. The tarp tension interacts with support plate 43 and the stop collar 58 to allow the free end of the tarp to pass cleanly over a heaped load. The height that the free end 38 of the tarp passes over the open top of the container can be controlled by the position of the stop collar along the length of the swing arm.

Figure 9:
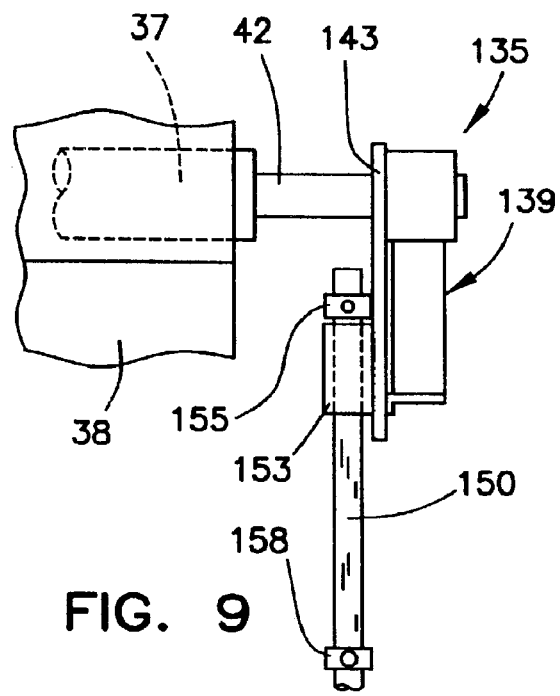
FIG. 9 is a side view of components of an alternative embodiment of the cover deployment apparatus of the present invention.
Figure 10:
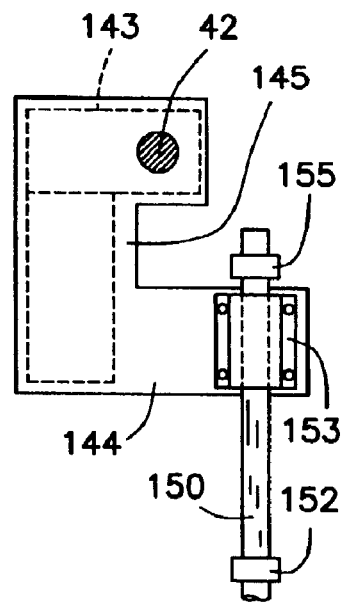
FIG. 10 is a rear view of certain components of the deployment apparatus shown in FIG. 9.

In the embodiment shown in FIGS. 2–6 the swing arm is sized to extend from the pivot point to the side rails of the dump body. In alternative embodiments, the swing arm is shorter and does not extend beyond the side rails. For instance, as shown in FIGS. 9 and 10, the deployment apparatus 135 includes a swing arm 150 that does not extend beyond the roll tube 37 at the tarp free edge 38. Instead, the support plate 143 has a portion 145 configured to bridge the distance between the end of the swing arm 150 and the mating axle 42 that is engaged to the roll tube 37. As with the previous embodiment, the support plate carries a drive assembly 139 that is operable to rotate the mating axle, and ultimately the tarp roll tube. The drive assembly 139 can be the same drive assembly 39 utilized in the prior embodiment.

The swing arm 150 is connected to the support plate 143 by way of a bearing block 153. The bearing block is mounted on a portion 144 of the support plate that is offset from the mating axle 42 as shown in FIG. 10. The axial movement of the swing arm relative to the bearing block is restricted by an upper collar 155 and a lower collar 158. The bearing block and collars can be constructed as the like components in the prior embodiment.

The deployment apparatus 135 and swing arm 150 operate in the same manner as the swing arm 50 described above. The axial movement of the support plate 143 and drive assembly 139 along the swing arm 150 is also retained, as is the function of the lower collar 158 to elevate the rolled tarp above the load within the dump body. Thus, it can be appreciated that the mechanism 135 shown in FIGS. 9 and 10 operates in the same manner as the deployment apparatus 35 described above. One benefit offered by the present embodiment is that the swing arm 150 does not project beyond the side of the dump body when the arm is at its maximum side-to-side extent. Instead, the farthest reach of the mechanism is dictated by the support plate 143, which need only reach as far as the mating axle 42. With this embodiment, the components of the deployment apparatus will never extend beyond the tarp itself.

Figure 11:
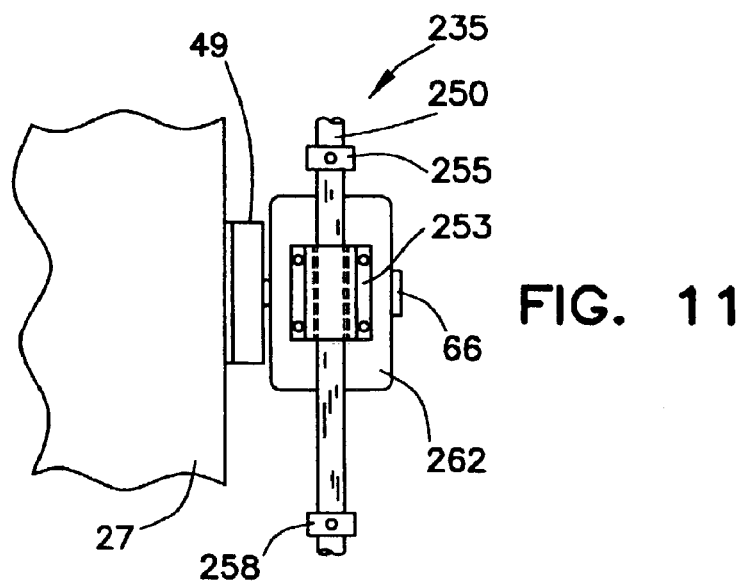
FIG. 11 is a side view of components of yet another embodiment of the cover deployment apparatus of the present invention.

A similar benefit can be obtained by the deployment apparatus 235 shown in FIG. 11. In this case, axial movement of the swing arm occurs at the pivot end of the arm. The swing arm 250 is slidably mounted to the spring housing 262 that is mounted to the dump body 27 at the spring mount 49. The spring housing 262 can be substantially similar to the spring housing 62 described above, particularly with respect to its function of carrying the torsion spring pack 68 and providing a means for translating the spring torque to pivoting movement of the deployment apparatus 235. However, unlike the spring housing 62 of the previous embodiment, the spring housing 262 shown in FIG. 11 does not include the hub 63 for supporting the swing arm.

Instead, the swing arm 250 is supported on the spring housing 262 by a bearing block 253. The translation of the swing arm relative to the bearing block, and ultimately the spring housing, is limited by upper and lower collars 255, 258. Again, the bearing block 253 and the collars 255, 258 can have the same construction and function as their counterparts in the prior embodiments.

In contrast to the prior embodiments, the swing arm 250 can be fixed to the support plate carrying the drive assembly. In other words, with this embodiment, the support plate does not translate along the length of the swing arm. Instead, the relative axial positioning of the support plate, and ultimately the roll tube 37, is accommodated by translation of the swing arm 250 relative to the spring housing 262. The effect of this movement is the same as with the prior embodiments—namely, that the rolled tarp not only swings across the open top of the container, it also moves to varying vertical positions above the container.

Since this relative movement is accomplished at the pivot end of the swing arm, the arm can be fastened to the support plate in an appropriate manner. For instance, the swing arm can be welded to the support plate, which can be the support plate 143 shown in FIGS. 9 and 10. Alternatively, the free end of the swing arm 250 can be held within a bearing block, such as the bearing block 153 of the deployment apparatus 135. In this instance, the upper and lower collars 155, 158 can be positioned immediately adjacent the bearing block 153 to essentially hold the swing arm fixed relative to that bearing block and support plate. As a further alternative, a number of set screws, like the set screws 56, can be threaded through threaded bores in the bearing block 153 to bear directly against the swing arm.

Figure 12:
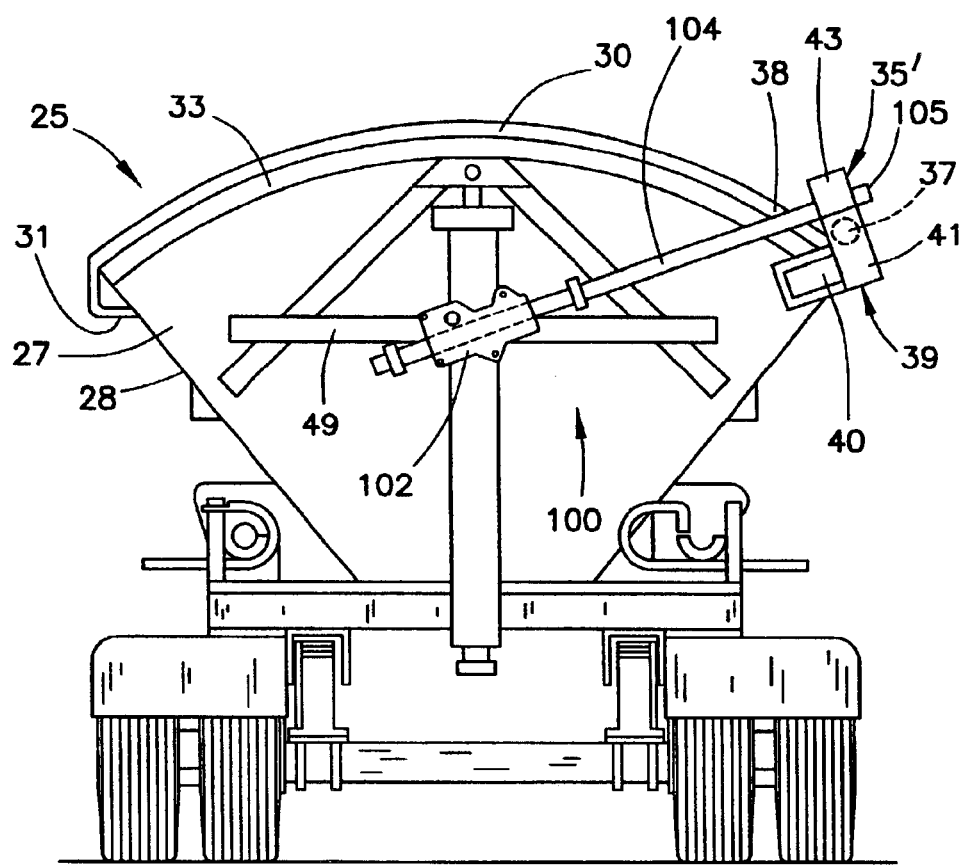
FIG. 12 is an end view of a side-dumping vehicle modified from the prior art to include a cover deployment apparatus in accordance with another embodiment of the present invention.

Referring now to FIG. 12, there is depicted an alternative embodiment of a lateral deployment apparatus generally designated 35'. It should be appreciated that the general function of the lateral deployment apparatus 35' is the same as the function of the lateral deployment apparatus 35 described above with the various exceptions described below. The side-to-side deployment apparatus 35' includes a swing arm assembly 100 in addition to the drive assembly 39, the drive assembly 39 preferably, but not necessarily, being the same as that described above. Again, while the drive assembly 39 rotates the roll tube 37, the swing arm assembly 100 operates to swing or pivot the entire drive assembly from one side of the dump body to the other side of the dump body. Thus, the swing arm assembly 100 can include a swing arm 104 that extends from a pivot mount, which is here embodied as a combined spring mechanism/swing arm bearing housing 102, mounted to the dump body 27 at the spring mount 49.

The drive assembly 39 is fixed to the swing arm 104 proximate a free end 105 thereof. The opposite pivot end of the swing arm 104 is slidably retained in and/or by the spring mechanism/swing arm bearing housing 102. In this manner, the drive assembly 39 moves up and down as the swing arm 104 moves up and down within the spring mechanism/swing arm bearing housing 102. Thus, rather than the drive assembly 39 moving up and down with respect to the fixed swing arm 104 as with the first embodiment described herein, the drive assembly 39 and swing arm 104 move up and down with respect to the spring mechanism/swing arm bearing housing 102.

Figure 13:
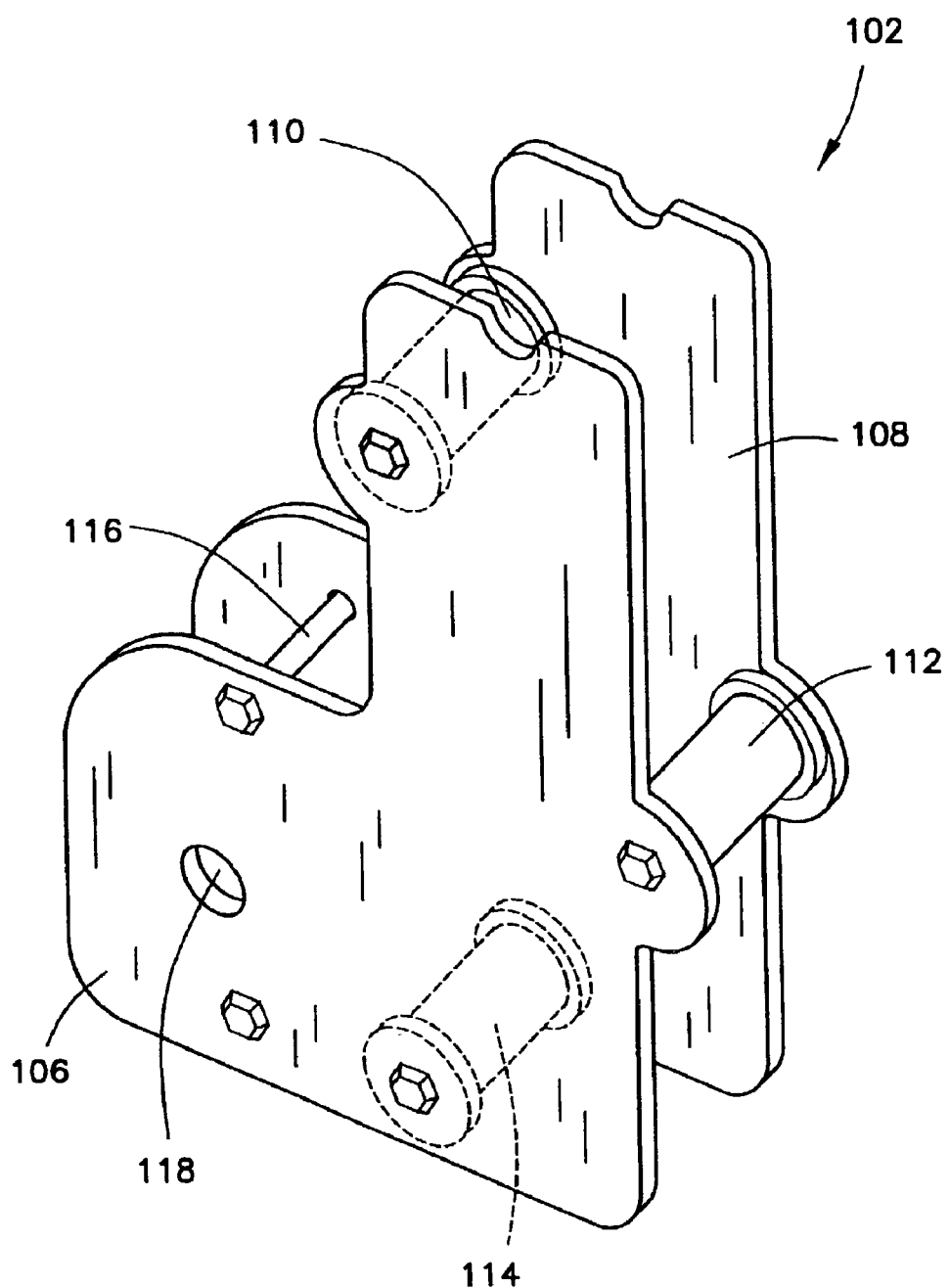
FIG. 13 is a perspective view of one side of the spring mechanism/swing arm retention component of the cover deployment apparatus shown in FIG. 12.

Turning to FIG. 13, the spring mechanism/swing arm bearing housing 102 is shown without a spring pack therein. The swing arm bearing housing 102 is characterized by two parallel plates 106 and 108 spaced a distance apart, the distance corresponding to at least the width of the swing arm 104. The swing arm can be rectangular as shown as FIG. 15. However, most preferably, the swing arm has a circular cross section. The plates 106 and 108 retain a top roller 110, a middle roller 112, and a bottom roller 114. The rollers 110, 112, and 114 are spaced to accommodate and laterally retain the swing arm 104 while moving up and down during deployment and retraction of the cover 30. The plate 106 also includes a pivot pin opening for a pivot pin (not shown) associated with a spring pack (see e.g. FIG. 3).

Figure 14:
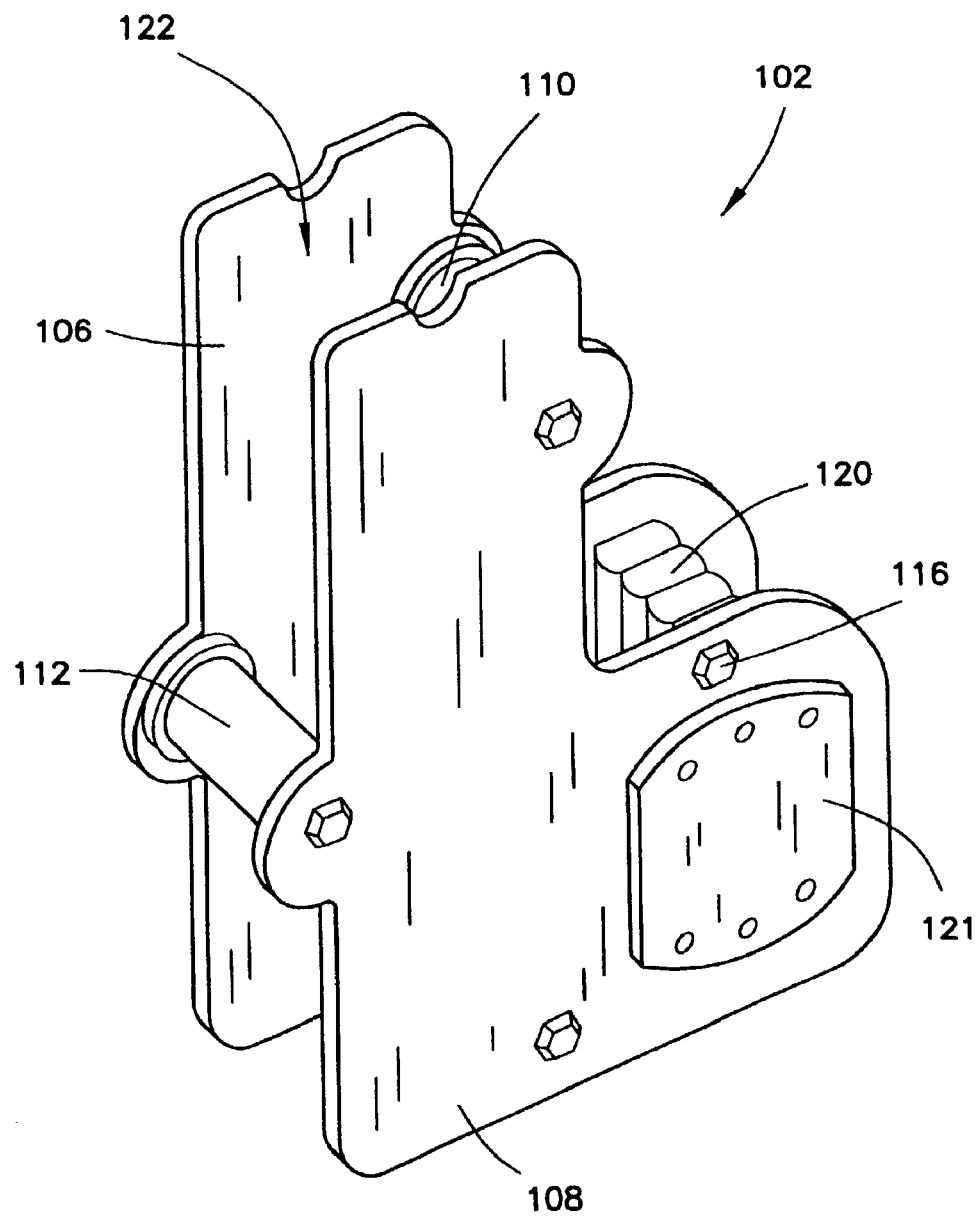
FIG. 14 is a perspective view of another side of the spring mechanism/swing arm retention component of the cover deployment apparatus shown in FIG. 12.

In FIG. 14, the spring mechanism/swing arm bearing housing 102 is shown with a spring mounting plate 121 disposed on the outside of the plate 108 and a spring pack 120 disposed between the plates 106 and 108 (i.e. within the housing 102). A pivot pin (not seen in FIG. 14 but analogous to the pivot pin 66 in FIG. 3) connects the housing 102 to the spring mounting plate 121, and ultimately establishes the pivot point 48 (see FIG. 2) for the swing arm assembly 100. The spring mounting plate 121 is attached to the spring mount 49 of the dump body 27. The spring mounting plate 121 allows for variable angular positioning of the spring mechanism relative to the container to vary the initial torsion force exerted by the mechanism.

The spring pack 120 includes a number of torsion springs that provide a torque reaction between the pivot pin and the reaction pin 116. A wide variety of spring mechanisms 102 can be utilized, with the understanding that the spring mechanism applies a biasing force to the swing arm 104. In accordance with the preferred embodiment, the torsion springs in the spring pack 120 can tend to bias the spring arm 104 to the position shown in FIG. 12 with the flexible tarp 30 fully deployed over the open top of the dump body 27. With this configuration, the drive assembly 39 then works against the torque generated by the spring mechanism 120. Specifically, as the drive assembly 39 causes the roll tube 37 to rotate, the tarp 30 is wound onto the roll tube. This winding operation causes tension in the tarp as the width of the tarp is shortened. This tension overcomes the spring force generated by the spring mechanism 120 to draw the entire mechanism toward the fixed end 31 of the tarp. The operation of powered roll tarps and spring assemblies is well known in the art.

The housing 102 defines a channel 122 between the plates 106 and 108 and to the inside of rollers 110, 112, 114. The channel 122 is sized to receive the swing arm 104 such that the swing arm 104 is translatable therein. Particularly, and as further illustrated in FIG. 15, the swing arm 104 is retained within the channel 122 and between (in contact with) the rollers 110, 112, 114.

Figure 15:
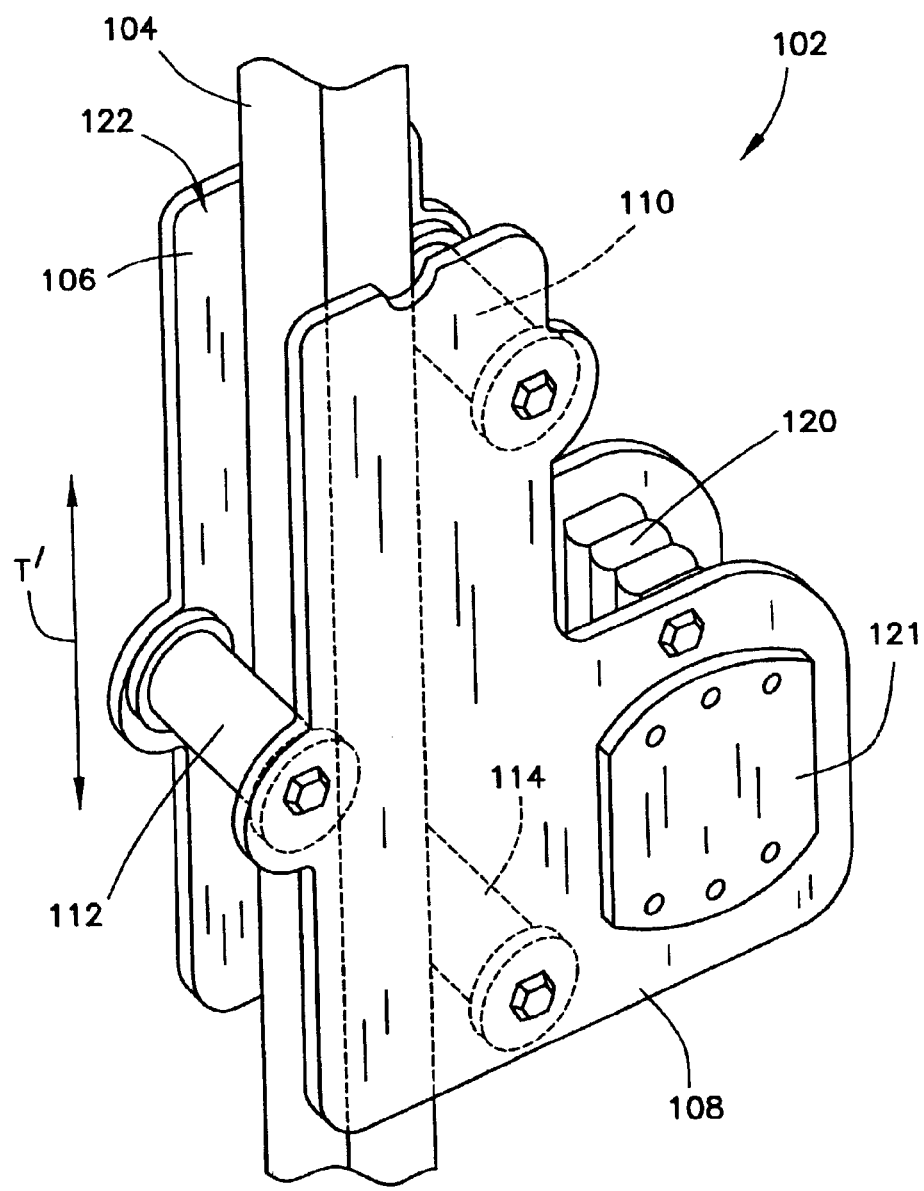
FIG. 15 is the perspective view of FIG. 14 having a swing arm situated therein particularly illustrating the manner of movement between the swing arm and the housing.

Turning now to FIG. 15, the action of the swing arm 104 with respect to the spring mechanism/swing arm bearing housing 102 is illustrated. The swing arm 104 is free to translate within the channel 122 as the spring housing 102 pivots either under the action of the spring pack 120 or the drive assembly 39, since the housing is pivotally fixed in position. Such translation of the swing arm 104 is indicated by the two-headed arrow labeled T'. As the swing arm 104 translates within the channel 122, the rollers 110, 112, 114 rotate to allow smooth movement of the swing arm 104.

Figure 16A:
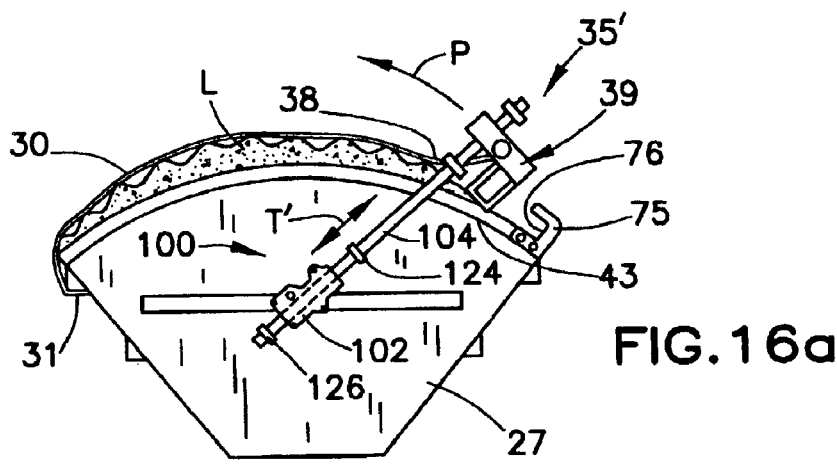
FIGS. 16a–16c are end views of the modified side-dumping vehicle from FIG. 12, with the cover deployment apparatus shown in different stages of its operation.
Figure 16B:
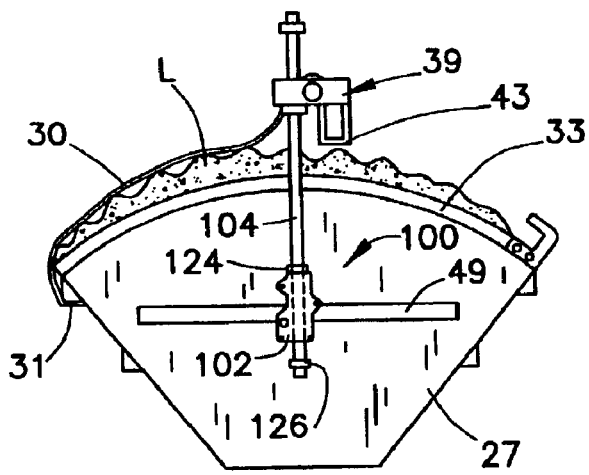
Figure 16C:
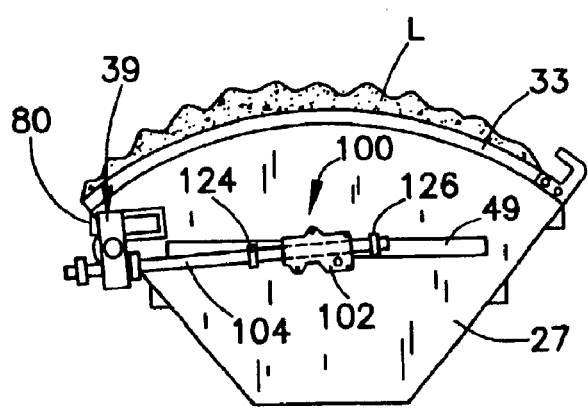

Referring to FIGS. 16a–16c, the operation of the side roll deployment apparatus 35' is depicted. The dump body 27 is shown with a load L contained therein. In the illustration to FIG. 16A, the drive assembly 39 has just been activated so that the roll tube has rotated and the tarp wound slightly onto the roll tube. With this movement, the entire assembly, including the support plate 43, drive assembly 39 and roll tube pivots or rotates in the direction of the arrow P and the roll tube dislodges from the lock plate 75. With this movement, tension applied at the free edge 38 tends to pull against the roll tube and ultimately against the drive assembly 39. This pulling movement causes the swing arm 104 to translate as illustrated by the double-headed arrow T' within the housing 102.

It should be appreciated that deployment of the tarp 30 over the load L causes the translation of the swing arm 104 and the drive assembly 39 as the tarp 30 covers the load L. The drive assembly 39 being fixed to the swing arm 104 moves up and down (translates) as the tarp moves over the uneven terrain of the load which, in turn, translates the swing arm. This relative translation is limited by an upper stop 124 and a lower stop 126 engaged to the swing arm 104 in a manner similar to the stops described above. The upper stop 124 limits the downward translation of the swing arm as the stop contacts the housing 102. Likewise, the lower stop 126 limits the upward translation of the swing arm as this stop contacts the underside of the housing.

As the drive assembly 39 continues to rotate, the roll tube also continues to rotate, drawing the deployment apparatus 35' to its central position as shown in FIG. 16b. In this position, both gravity and tension in he tarp 30 causes the swing arm 104 to translate downward within the housing 102 until the upper stop 124 contacts the housing. With this orientation, the tarp is in a partially wound position and is supported above both the container and its load L by the stop 124.

As the drive assembly 39 continues to operate, the tarp is fully wound onto the roll tube into a fully wound configuration as shown in FIG. 16c. Preferably, the wound portion of the tarp is directly adjacent to the fixed end 31 of the tarp. The lower stop 126 limits the outward translation of the swing arm 104 when it contacts the underside of the housing 102. Nominally, the translation of the swing arm is limited so that the lower stop 126 never comes into play. However, this stop is important to prevent accidental disassembly of the swing arm from the deployment apparatus should it translate far enough to fall out of the housing 102.

Preferably, and as shown clearly in FIG. 16c, the wound tarp is situated below the side rail 80 of the modified dump body 27. This position of the wound tarp is another beneficial feature of the present invention. In particular, the tarp and roll tube are completely concealed from the side rail 80 of the dump body 27 so that when the body is pivoted toward that side (as shown in FIG. 1), the deployment apparatus 35' and tarp 30 will not interfere with the removal of the contents of the body. Likewise, with the tarp in its wound position as shown in FIG. 16c, the dump body can be pivoted to the other side of the vehicle without fear of the deployment apparatus 35' falling forward due to gravity.

Figure 17:
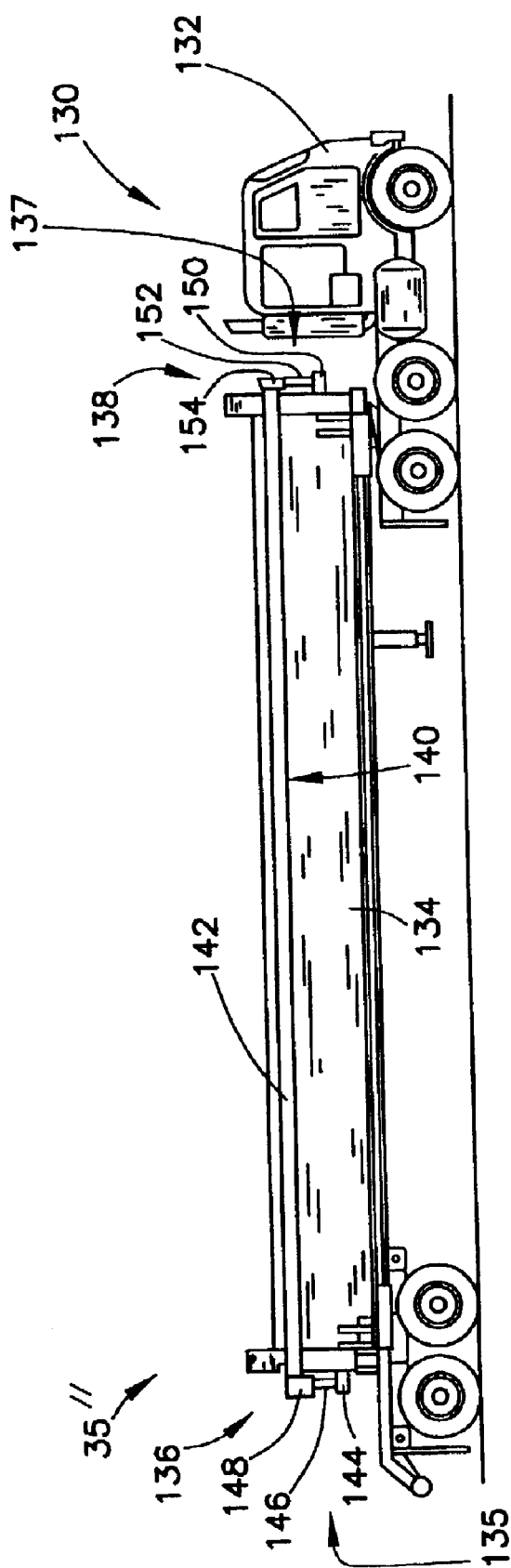
FIG. 17 is a side view of a modified side-dumping vehicle having another alternative embodiment of a cover deployment apparatus.

Referring now to FIG. 17, there is depicted yet another embodiment of a deployment apparatus generally designated 35". The deployment apparatus 35" is shown situated on a truck 130, the truck 130 characterized by a cab 132 coupled to a dump body 134. The deployment apparatus 35" is characterized by a first swing arm assembly 136 disposed on a first (one) end 135 of the dump body 134 and a second swing arm assembly 138 disposed on a second (another) end 137 of the dump body 134. The first and second swing arm assemblies 136 and 138 carry a roll tube 140 that has a tarp 142 rolled or wrapped therearound. The deployment apparatus 35" shown in FIG. 17 is depicted in a non-deployed state. It should also be appreciated that the deployment apparatus 35" functions and/or operates in the same or similar manner to the deployment apparatuses described above.

The first swing arm assembly 136 has a spring/swing arm retention mechanism 144 that is attached to the first end 135 of the dump body 134. The spring/swing arm retention mechanism 144 may be the spring/swing arm retention mechanism 47 described above, may be the spring/swing arm retention mechanism 102 described above, or may be another type of spring/swing arm retention mechanism in accordance with the principles described herein. A swing arm 146 extends from the spring/swing arm retention mechanism 144. The swing arm 146 is consistent in form, function and/or operation with the swing arm appropriate for the spring/swing arm retention mechanism utilized.

A drive assembly 148 is operatively attached to and/or proximate the free end of the swing arm 146. The drive assembly 148 is also consistent in form, function and/or operation with the drive assemblies 39 or 39" appropriate for the spring/swing arm retention mechanism utilized. The roll tube 140 is operatively coupled to the drive assembly 148 in a same or similar manner to that described above.

The second swing arm assembly 138 is characterized by a spring/swing arm retention mechanism 150 that is attached to the second end 137 of the dump body 134. The spring/swing arm retention mechanism may be the spring/swing arm retention mechanism 47 described above, may be the spring/swing arm retention mechanism 102 described above, or may be another type of spring/swing arm retention mechanism in accordance with the principles described herein. A swing arm 152 extends from the spring/swing arm retention mechanism 150. The swing arm 152 is consistent in form, function and/or operation with the swing arm appropriate for the spring/swing arm retention mechanism utilized.

A roll mount 154 is coupled to the free end of the swing arm 152 and attaches to the tarp roll 140. The roll mount 154 preferably non-driven (passive) and is operative to allow the tarp roll 140 to rotate according to the drive assembly 148. The roll mount 154, however, may be driven either in synchronization or not with the drive assembly 148.

While the invention has been illustrated and described in detail in the drawings and foregoing description, the same should be considered as illustrative and not restrictive in character. It is understood that only the preferred embodiments have been presented and that all changes, modifications and further applications that come within the spirit of the invention are desired to be protected.

For instance, it is understood that the support plate and bearing block configurations can be modified from the specific depicted embodiments, provided they retain their ascribed functions. Thus, the bearing blocks can be integrated directly into the support plate, such as by bending a portion of the plate to form a cylindrical portion, or providing a cast support plate with the bearing block.

Likewise, the stops or collars that are used to limit the relative axial or longitudinal movement between the bearing block and the swing arm can adopt a variety of configurations. For instance, the upper collars 55 and 155, and the lower collar 258 can constitute an enlarged end to the swing arm. The collars themselves can be replaced by a cotter pin or transverse dowel arrangement, again provided that the modified components are capable of supporting the deployment apparatus at its limits of movement.

In addition to the above, while the various embodiments contemplate a self-contained drive assembly carried by the support plate, alternative drive arrangements can be utilized provided they mate with and rotate the roll tube of the tarp, and provided they accommodate the translation of the support for the roll tube relative to the swing arms. For instance, the drive motor and/or transmission can be disposed at the pivot end of the swing arm, with a drive chain following the swing arm to a sprocket connected to the roll tube or mating axle. Of course, some accommodation would be necessary to allow the drive chain to account for the variable positions of the roll tube support assembly. In addition, the drive assembly can constitute an internal drive mechanism disposed within the roll tube itself. The roll tube would still be rotatably supported on the slidable support assembly; however, the motor would be mounted on the roll tube rather than on the support assembly.

What is claimed is:

1. A deployment apparatus for a flexible cover sized to cover an open-topped container, the flexible cover connected at one end to the container and having an opposite end connected to a roll tube, said deployment apparatus comprising:
   a swing arm pivotably mounted at a pivot point to the container, said swing arm having a length from said pivot point to a free end thereof sized so that said free end extends adjacent the open top of the container when said swing arm is pivoted relative to the container; and
   a support assembly rotatably supporting the roll tube, said support assembly slidably supported on said swing arm so that said support assembly translates along the length of said swing arm.

2. A deployment apparatus for a flexible cover sized to cover an open-topped container, the flexible cover connected at one end to the container and having an opposite end connected to a roll tube, said deployment apparatus comprising:
   a swing arm pivotably mounted at a pivot point to the container, said swing arm having a length from said pivot point to an opposite end thereof sized so that said opposite end extends adjacent the open top of the container when said swing arm is pivoted relative to the container; and
   a support assembly rotatably supporting the roll tube, said support assembly slidably supported on said swing arm so that said support assembly translates along the length of said swing arm,
   wherein said swing arm includes a stop disposed thereon between said pivot point and said opposite end, said stop operable to limit the translation of said support assembly along said swing arm.

3. The deployment apparatus according to claim 2, wherein said stop is disposed on said swing arm between said support assembly and said opposite end so that said support assembly is slidably supported on said swing arm between said pivot point and said stop.

4. The deployment apparatus according to claim 2, wherein said stop includes a collar slidably mounted over said swing arm and means for fastening said collar to said swing arm.

5. The deployment apparatus according to claim 2, in which the flexible cover is connected to one side of the container and is deployable across the container to the other side thereof, wherein:
   said length of said swing arm is greater than the distance from the pivot point to either side of the container; and
   said stop is disposed on said swing arm at a distance from said pivot point that is less than the distance from the pivot point to either side of the container.

6. The deployment apparatus according to claim 2, wherein said stop is a first stop disposed on said swing arm between said support assembly and said pivot point.

7. The deployment apparatus according to claim 6, wherein said first stop is disposed on said swing arm above the open top of the container when said swing arm is pivoted relative to the container.

8. The deployment apparatus according to claim 6, wherein said swing arm includes a second stop disposed thereon between said support assembly and said opposite end so that said support assembly is slidably supported on said swing arm between said first stop and said second stop.

9. The deployment apparatus according to claim 6, wherein said first stop is disposed on said swing arm so that when said support assembly contacts said first stop said support assembly supports the roll tube away from contact with the container.

10. The deployment apparatus according to claim 9, wherein said length of said swing arm is sized so that said opposite end extends above the open top of the container.

11. The deployment apparatus according to claim 9, wherein:
    said length of said swing arm is sized so that said opposite end does not extend above the open top of the container; and
    said support assembly includes a portion configured to extend away from said opposite end of said swing arm to support the roll tube away from contact with the container.

12. The deployment apparatus according to claim 2, in which the flexible cover is connected to one side of the container and is deployable across the container to the opposite side thereof, wherein:
    said swing arm is pivotable from a retracted position adjacent the one side of the container in which the flexible cover is retracted, and a deployed position adjacent the opposite side of the container in which the flexible cover is deployed across the open top of the container;

the apparatus further comprises a spring mechanism connecting said swing arm to the container, said spring mechanism operable to bias said swing arm toward the deployed position; and said support assembly includes a drive assembly operable to wind the flexible cover onto the roll tube in opposition to the bias of said spring mechanism to thereby maintain the flexible cover in tension as it is wound or unwound.

13. The deployment apparatus according to claim 12, wherein said spring mechanism includes:

a housing connected to said swing arm at said pivot point thereof;

a pivot shaft connected to the container and extending through said housing; and a number of torsion springs disposed within said housing and engaged between said housing and said pivot shaft to apply a biasing torque therebetween.

14. A deployment apparatus for a flexible cover sized to cover an open-topped container, the flexible cover connected at one end to the container and having an opposite end connected to a roll tube, said deployment apparatus comprising:

a swing arm pivotably mounted at a pivot point to the container, said swing arm having a length from said pivot point to an opposite end thereof sized so that said opposite end extends adjacent the open too of the container when said swing arm is pivoted relative to the container;

a support assembly rotatably supporting the roll tube, said support assembly slidably supported on said swing arm so that said support assembly translates along the length of said swing arm; and, said support assembly includes a drive assembly supporting the roll tube and operable to rotate the roll tube so that the flexible cover winds onto or unwinds from the roll tube, said drive assembly including;

a support plate;

a drive motor mounted on said support plate;

a transmission mechanism connecting said drive motor to the roll tube; and a bearing assembly for slidably supporting said support plate on said swing arm.

15. The deployment apparatus according to claim 14, wherein said support assembly includes a drive assembly supporting the roll tube and operable to rotate the roll tube, said drive assembly including a reversible motor operable to wind and unwind the flexible cover around the roll tube.

16. A deployment apparatus for a flexible cover sized to cover an open-topped container, the flexible cover connected at one end to the container and having an opposite end connected to a roll tube, said deployment apparatus comprising:

a swing arm pivotably mounted at a pivot point to the container, said swing arm having a length from said pivot point to an opposite end thereof sized so that said opposite end extends adjacent the open top of the container when said swing arm is pivoted relative to the container, wherein said length of said swing arm is sized so that said opposite end extends above the open top of the container; and a support assembly rotatably supporting the roll tube, said support assembly slidably supported on said swing arm so that said support assembly translates along the length of said swing arm.

17. The deployment apparatus according to claim 1, in which the container has opposite sides, with the flexible cover connected to one side of the container and sized to span across the open top to the opposite side of the container, wherein said pivot point is disposed relative to the container so that said length of said swing arm is less than the distance from said pivot point to either of the opposite sides of the container.

18. The deployment apparatus according to claim 16, wherein said pivot point is disposed relative to the top of the container so that said length of said swing arm is greater than the distance from said pivot point to the top of the container at a portion of the container between the opposite sides.

19. The deployment apparatus according to claim 18, wherein said swing arm includes a stop disposed thereon between the support assembly and said opposite end of said swing arm.

20. The deployment apparatus according to claim 19, wherein:

said swing arm is pivotable from a retracted position in which said opposite end is adjacent one side of the container and a deployed position in which said opposite end is adjacent the opposite side of the container; and said support assembly is configured to support the roll tube in contact with either side of the container when said swing arm is in said retracted or deployed positions.

21. A method for deploying a flexible cover sized to cover an open-topped container, the flexible cover connected at one end to one side of the container and having an opposite free end connected to a roll tube that is deployable across the container to the other side thereof, the method comprising the steps of:

providing a swing arm pivotably mounted to the container to pivot between the sides of the container, the swing arm having a free end portion extending adjacent the open top of the container;

slidably supporting the roll tube on the free end portion;

winding the flexible cover onto the roll tube so that tension in the flexible cover as it is wound onto the roll tube pulls the swing arm toward the one side of the container and so that the tension in the cover causes the roll tube to translate relative to the free end portion of the swing arm; and limiting the downward movement of the roll tube relative to the free end portion as the swing arm pivots across a middle portion of the container so that the flexible cover is elevated above the container as the roll tube passes across the middle portion.

22. The method according to claim 21, wherein the step of winding the flexible cover continues until the flexible cover is fully wound onto the roll tube.

23. The method according to claim 22, wherein the flexible cover is connected to the container below the one side and the step of winding continues until the wound cover is immediately adjacent the connected end of the cover.

24. The method according to claim 21, wherein the step of limiting the downward movement of the roll tube only occurs at the middle portion of the container.

\* \* \* \* \*

UNITED STATES PATENT AND TRADEMARK OFFICE
CERTIFICATE OF CORRECTION

PATENT NO. : 6,857,682 B2  Page 1 of 1
DATED : February 22, 2005
INVENTOR(S) : Eggers et al.

It is certified that error appears in the above-identified patent and that said Letters Patent is hereby corrected as shown below:

Column 15,
Line 30, replace "too" with -- top --.

Signed and Sealed this

Thirtieth Day of August, 2005

JON W. DUDAS
*Director of the United States Patent and Trademark Office*